(12) United States Patent
Tsukida

(10) Patent No.: US 6,400,414 B1
(45) Date of Patent: Jun. 4, 2002

(54) TRANSMITTER, RECEIVER, TRANSMITTER-RECEIVER, TRANSMITTING METHOD, RECEIVING METHOD AND TRANSMITTING/RECEIVING METHOD

(75) Inventor: Tatsuo Tsukida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/429,581

(22) Filed: Oct. 28, 1999

(30) Foreign Application Priority Data

Oct. 30, 1998 (JP) ............................................. 10-311175

(51) Int. Cl.[7] ............................. H04N 9/74; H04N 5/38; H04N 5/44

(52) U.S. Cl. ........................ 348/581; 348/588; 348/723; 348/725

(58) Field of Search ................................ 348/561, 581, 348/584, 588, 723, 724, 725, 726, 704; H04N 9/74, 3/223, 5/38, 5/40, 5/44, 5/455

(56) References Cited

U.S. PATENT DOCUMENTS 5,442,403 A * 8/1995 Yasumoto .................... 348/432
5,493,329 A * 2/1996 Ohguchi ....................... 348/17

* cited by examiner

*Primary Examiner*—Sherrie Hsia
(74) *Attorney, Agent, or Firm*—Frommer Lawrence & Haug LLP; William S. Frommer; Darren M. Simon

(57) ABSTRACT

A transmitter and receiver for transmitting and receiving a plurality of image data channels as an encoded data stream. The transmitting part comprises a plurality of prefilters for reducing the resolution of each image in the image data channels, a frame memory for sequentially arranging the resolution reduced images output from the prefilters into a full resolution frame, an encoder for encoding the full resolution frame into an encoded data stream, and a transmitter for transmitting the encoded data stream. The receiving part comprises a receiver for receiving the encoded data stream, a decoder for decoding the encoded data stream and sequentially separating the decoded data stream into a plurality of resolution reduced images corresponding to the number of image data channels, and a plurality of postfilters for increasing the resolution of each of the resolution reduced images into full resolution images and outputting the full resolution images as the image data channels.

14 Claims, 14 Drawing Sheets

TRANSMITTER, RECEIVER, TRANSMITTER-RECEIVER, TRANSMITTING METHOD, RECEIVING METHOD AND TRANSMITTING/RECEIVING METHOD

BACKGROUND OF THE INVENTION

1. Field of the Invention

The present invention relates to a transmitter, a receiver, a transmitter-receiver, a transmitting method, a receiving method and a transmitting/receiving method, and more particularly, is suitably applied to a transmitter, a receiver, a transmitter-receiver, a transmitting method, a receiving method and a transmitting/receiving method that transmit/receive moving image data of a plurality of channels via prescribed transmission lines.

2. Description of the Related Art

As such a transmitter-receiver, for instance, there is one that has a configuration as shown in FIG. 1.

A transmitter-receiver 1 configured like that performs prescribed encoding processing and multiplex processing or the like on moving image signals S1 to S4 and D5 to D8 in analog waveform or in digital waveform, for a plurality of channels, that are supplied from an external device, in the encoding part 4 of a transmitter 2, and transmits obtained multiplexed data D17 to the receiving part 6 of a receiver 3 via a transmitting part 5.

The receiving part 6 outputs the multiplexed data D17 to be given to a decoding part 7. In the decoding part 7, prescribed separating and decoding processing or the like are performed on the multiplexed data D17. And obtained moving image reproducing signals S5 to S8 or moving image reproducing data D18 to D21 for a plurality of channels are outputted to an external device. ;

Here, in the encoding part 4 of transmitter 2, as shown in FIG. 2, first to fourth moving image data D1 to D4 that are obtained by performing digital conversion on the first to fourth moving image signals S1 to S4 in analog waveform, to be given from the external device to first to fourth analog input terminals 8A to 8D in first to fourth A/D converters 9A to 9D, and/or fifth to eighth moving image data D5 to D8 to be given from the external device to first to fourth digital input terminals 8E to 8H, are supplied to corresponding first to fourth selecting parts 10A to 10D.

The first to fourth selecting parts 10A to 10D select one out of the respectively supplied first to eighth moving image data D1 to D8, and they each transmit the selected ones to corresponding first to fourth encoders 11A to 11D, as first to fourth selected moving image data D9 to D12.

The first to fourth encoders 11A to 11D respectively perform prescribed encoding processing on the first to fourth moving image data that respectively form the first to fourth selected moving image data D9 to D12 to be supplied. Then, the encoders 11A to 11D convert obtained first to fourth coded moving image data into transport stream (TS) packets according to the format defined by a moving picture experts group phase 2 (MPEG2) standard, and sequentially transmit first to fourth TS packet stream data D13 to D16 that are obtained by sequentially and respectively TS-packetizing the first to fourth coded moving image data to a multiplexer 12.

The multiplexer 12 multiplexes the first to fourth TS packet stream data D13 to D16 to be supplied, and transmits obtained multiplex data D17 via the transmitting part 5 to the receiving part 6 of the receiver 3.

On the other hand, as shown in FIG. 3, the decoding part 7 of the receiver 3 receives the multiplex data D17 supplied from the receiving part 6 with a separating part 13. In the separating part 13, the first to fourth TS packet stream data D13 to D16 that are obtained by performing prescribed separating processing on the multiplex data D17 are transmitted to corresponding first to fourth decoders 14A to 14D.

The first to fourth decoders 14A to 14D separate the supplied first to fourth TS packet stream data D13 to D16, according to the format defined by the MPEG2 standard, and respectively perform prescribed decoding processing on first to fourth coded moving image data obtained by sequentially separating the first to fourth TS packet stream data D13 to D16.

Then, the first to fourth decoders 14A to 14D supply thus obtained first to fourth moving image reproducing data D18 to D21 that form the first to fourth moving image data composed of different moving images to respectively corresponding first to fourth D/A converters 15A to 15D to perform analog conversion, and the resultants are output to the external device as first to fourth moving image reproducing signals S5 to S8 in analog waveform via corresponding first to fourth analog output terminals 16A to 16D. Or the decoders 14A to 14D output to the external device the first to fourth moving image reproducing data D18 to D21 as they are via corresponding first to fourth digital output terminals 16E to 16H.

However, in the above transmitter-receiver 1, in the transmitter 2, the encoders 11A to 11D for the number of input channels must be provided in the encoding part 4 to perform prescribed encoding processing, and also the multiplexer 12 must be provided to further multiplex the first to fourth TS packet stream data D13 to D16 obtained in the encoders 11A to 11D. This causes a problem that the size of the circuit of the encoding part 4 of the transmitter 2 is enlarged and complicated.

Also in the receiver 3, the separating part 13 is necessary for the decoding part 7 to separate the multiplex data D17, and also the decoders 14A to 14D for the number of output channels must be provided to further separate the first to fourth TS packet stream data D13 to D16 which are obtained in the separating part 13 and to perform prescribed decoding processing on them. This causes a problem that the size of circuit of the decoding part 7 in the receiver 3 is enlarged and complicated.

Above points pose a problem that the size of the circuit of the whole transmitter-receiver 1 composed of these transmitter 2 and receiver 3 is enlarged and complicated.

SUMMARY OF THE INVENTION

In view of the foregoing, an object of the present invention is to provide a transmitter, a receiver, a transmitter-receiver, a transmitting method, a receiving method and a transmitting/receiving method that remarkably reduces and simplifies the circuit scale.

The foregoing object and other objects of the invention have been achieved by the provision of a transmitter which comprises: a resolution conversion processing means for performing prescribed resolution conversion processing on plural first image data to be supplied to reduce the image size in the vertical direction and/or horizontal direction respectively; a synthesized image generating means for generating second image data that is composed of image data for one frame, based on each of the first image data subjected to the resolution conversion processing; an encoding means for performing prescribed encoding processing on the second image data; and a transmitting means for transmitting the second image data subjected to the encoding processing.

Therefore, in this transmitter, only one circuit can cover the whole encoding processing.

Further the present invention provides a receiver which comprises: a receiving means for receiving first image data to be transmitted from a transmitter; a decoding means for performing prescribed decoding processing on the first image data; an image data separating means for separating the first image data subjected to the decoding processing into plural second image data; and a resolution conversion processing means for performing prescribed resolution conversion processing on each of the second image data to magnify the image size in the vertical direction and/or horizontal direction respectively.

Therefore, in this receiver, only one circuit can cover the whole decoding processing.

Furthermore the present invention provides a transmitter-receiver which comprises: a resolution conversion processing means for performing prescribed resolution conversion processing on plural first image data to be supplied, to reduce the image size in the vertical direction and/or horizontal direction respectively; a synthesized image generating means for generating second image data that is composed of image data for one frame, based on each of the first image data subjected to the resolution conversion processing; an encoding means for performing prescribed encoding processing on the second image data; a transmitting means for transmitting the second image data subjected on the encoding processing; a receiving means for receiving the second image data to be transmitted from a transmitter; a decoding means for performing prescribed decoding processing on the second image data; an image data separating means for separating the second image data subjected to the decoding processing into plural third image data; and a resolution conversion processing means for performing prescribed resolution conversion processing on each of the third image data to magnify the image size in the vertical direction and/or horizontal direction respectively.

Therefore, in this transmitter-receiver, only one circuit can cover the encoding processing in the transmitter and the decoding processing in the receiver altogether.

Furthermore the present invention provides a transmitting method which comprises: a first step of performing prescribed resolution conversion processing on plural first image data to be supplied, to reduce the image size in the vertical direction and/or horizontal direction respectively; a second step of generating second image data that is composed of image data for one frame based on each of the first image data subjected to the resolution conversion processing; a third step of performing prescribed encoding processing on the second image data; and a fourth step of transmitting the second image data subjected to the encoding processing.

Therefore, only one circuit can cover the whole encoding processing.

Furthermore the present invention provides a receiving method which comprises: a first step of receiving first image data to be transmitted from a transmitter; a second step of performing prescribed decoding processing on the first image data; a third step of separating the first image data subjected to the decoding processing into plural second image data; and a fourth step of performing prescribed resolution conversion processing on each of the second image data, to magnify the image size in the vertical direction and/or horizontal direction respectively.

Therefore, in this receiving method, only one circuit can cover the whole decoding processing.

Furthermore, the present invention provides a transmitting/receiving method which comprises: a first step of performing prescribed resolution conversion processing on plural first image data to be supplied to reduce the image size in the vertical direction and/or horizontal direction respectively; a second step of generating second image data that is composed of image data for one frame, based on each of the first image data subjected to the resolution conversion processing; a third step of performing prescribed encoding processing on the second image data; a fourth step of transmitting the second image data subjected to the encoding processing; a fifth step of receiving the second image data to be transmitted from a transmitter; a sixth step of performing prescribed decoding processing on the second image data; a seventh step of separating the second image data subjected to the decoding processing into plural third image data; and an eighth step of performing prescribed resolution conversion processing on each of the third image data to magnify the image size in the vertical direction and/or horizontal direction respectively.

Therefore, in this transmitting/receiving method, only one circuit can cover the encoding processing in the transmitter and the decoding processing in the receiver.

The nature, principle and utility of the invention will become more apparent from the following detailed description when read in conjunction with the accompanying drawings in which like If parts are designated by like reference numerals or characters.

DETAILED DESCRIPTION OF THE EMBODIMENT

Preferred embodiments of the present invention will be described with reference to the accompanying drawings:

(1) Configuration of Transmitter-receiver According to First Embodiment

Figure 1:
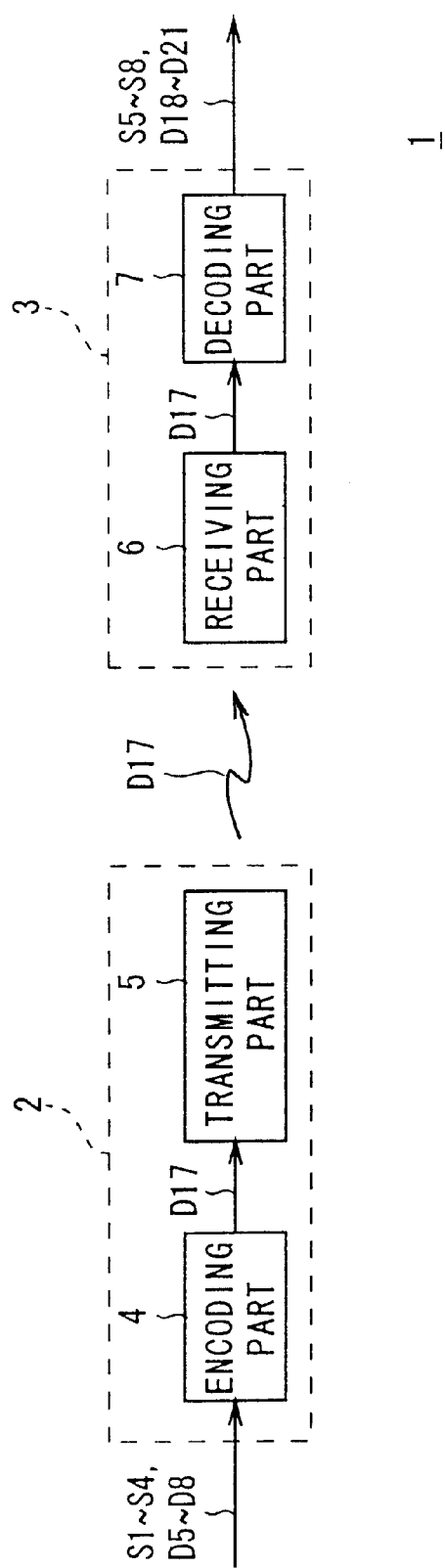
FIG. 1 is a block diagram showing the configuration of a conventional transmitter-receiver.
Figure 4:
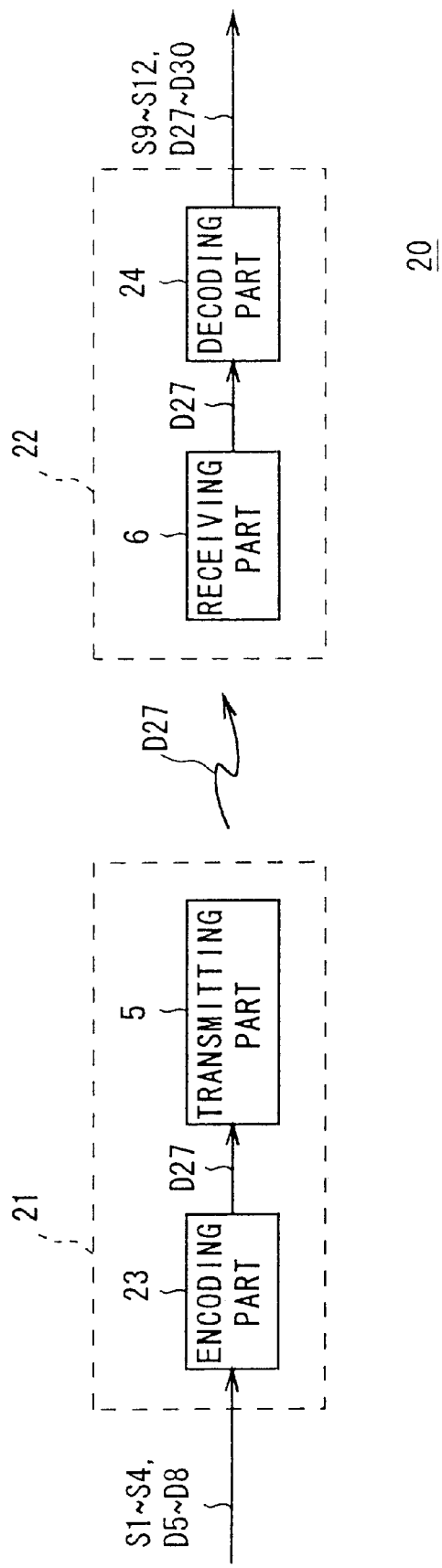
FIG. 4 is a block diagram showing the configuration of a transmitter-receiver according to a first embodiment.

Referring to FIG. 4 in which the same reference numerals are added to corresponding parts of FIG. 1, 20 generally shows a transmitter-receiver according to an embodiment of the present invention. This transmitter-receiver 20 is configured similar to the conventional transmitter-receiver 1 (FIG. 1), except for the configuration of the encoding part 23 of transmitter 21 and the decoding part 24 of receiver 22.

Figure 2:
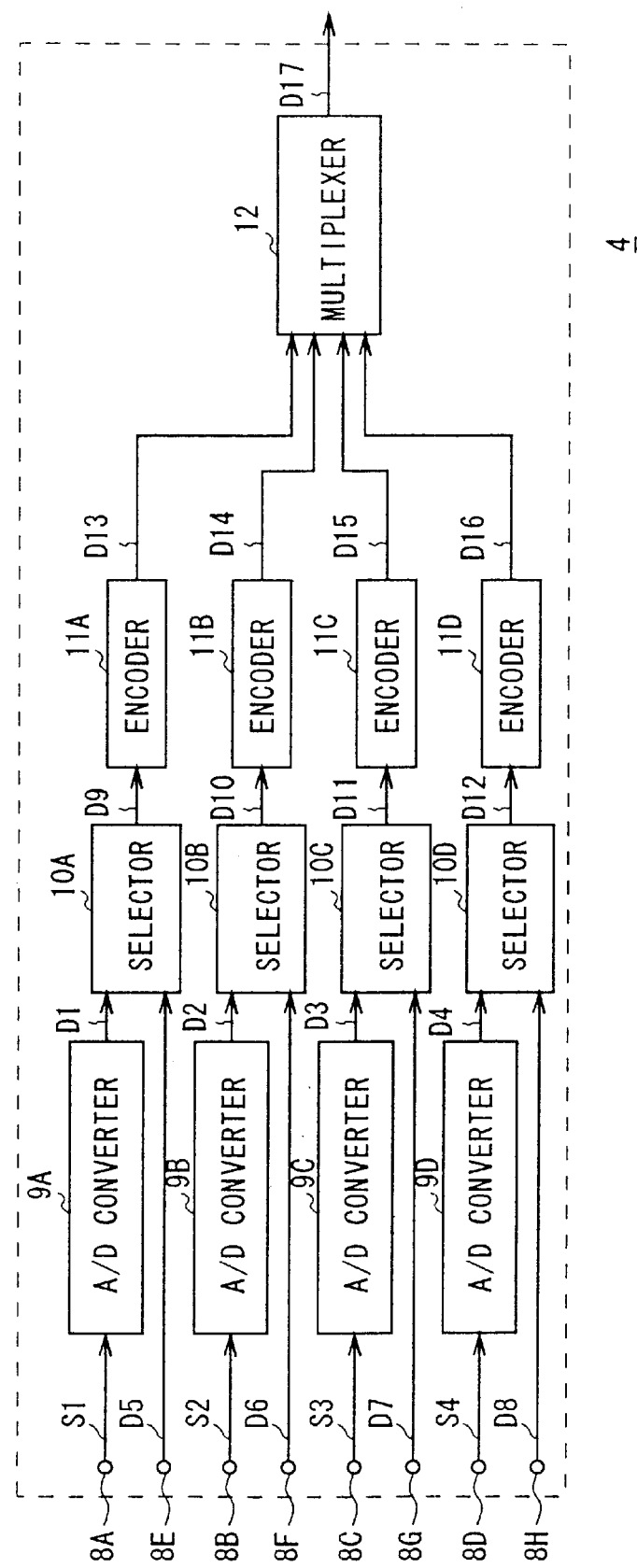
FIG. 2 is a block diagram showing the configuration of a conventional encoding part.
Figure 5:
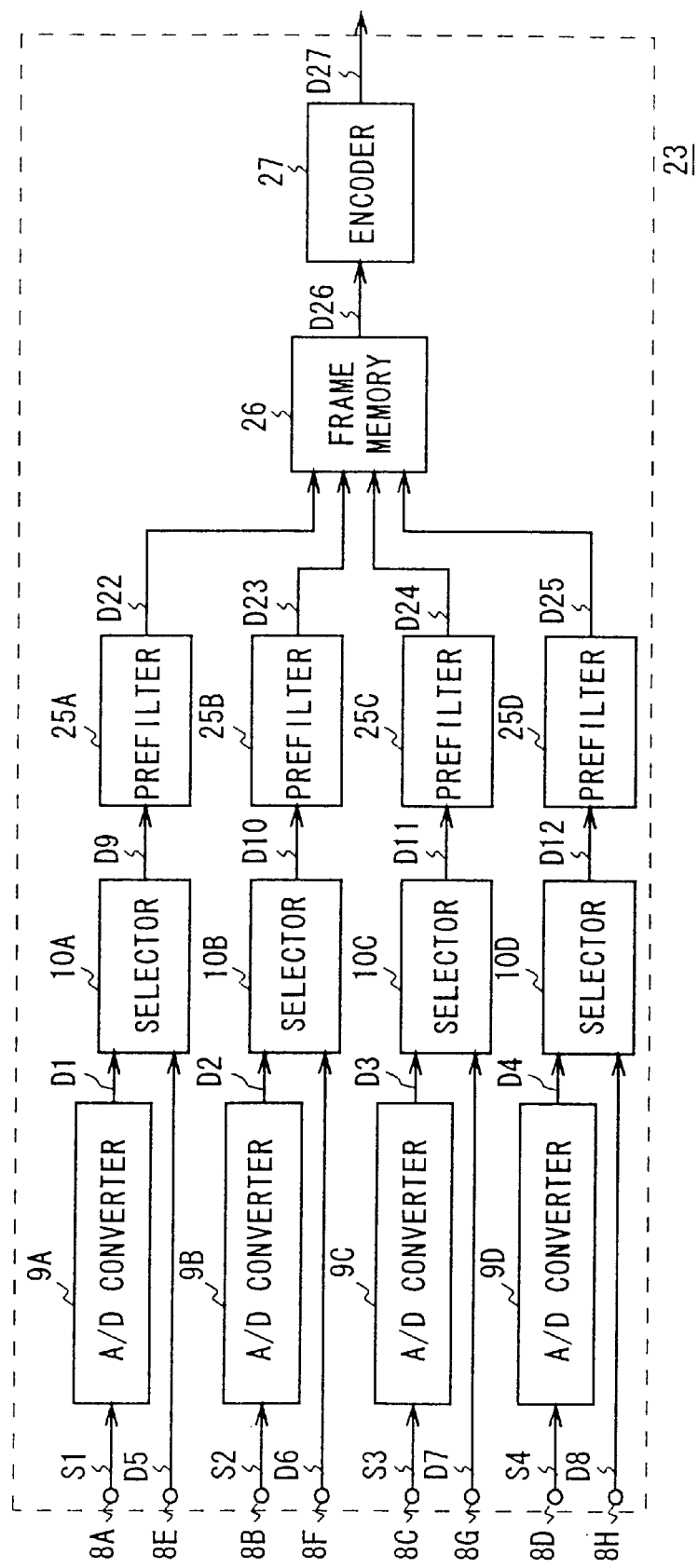
FIG. 5 is a block diagram showing the configuration of an encoding part according to the first embodiment.

In this case, the encoding part 23 or the transmitter 21 is configured as shown in FIG. 5 in which the same reference numerals are added to corresponding parts of FIG. 2. The encoding part 23 supplies first to fourth selected moving image data D9 to D12 to be outputted from first to fourth selecting parts 10A to 10D to corresponding first to fourth prefilters 25A to 25D.

Figure 6:
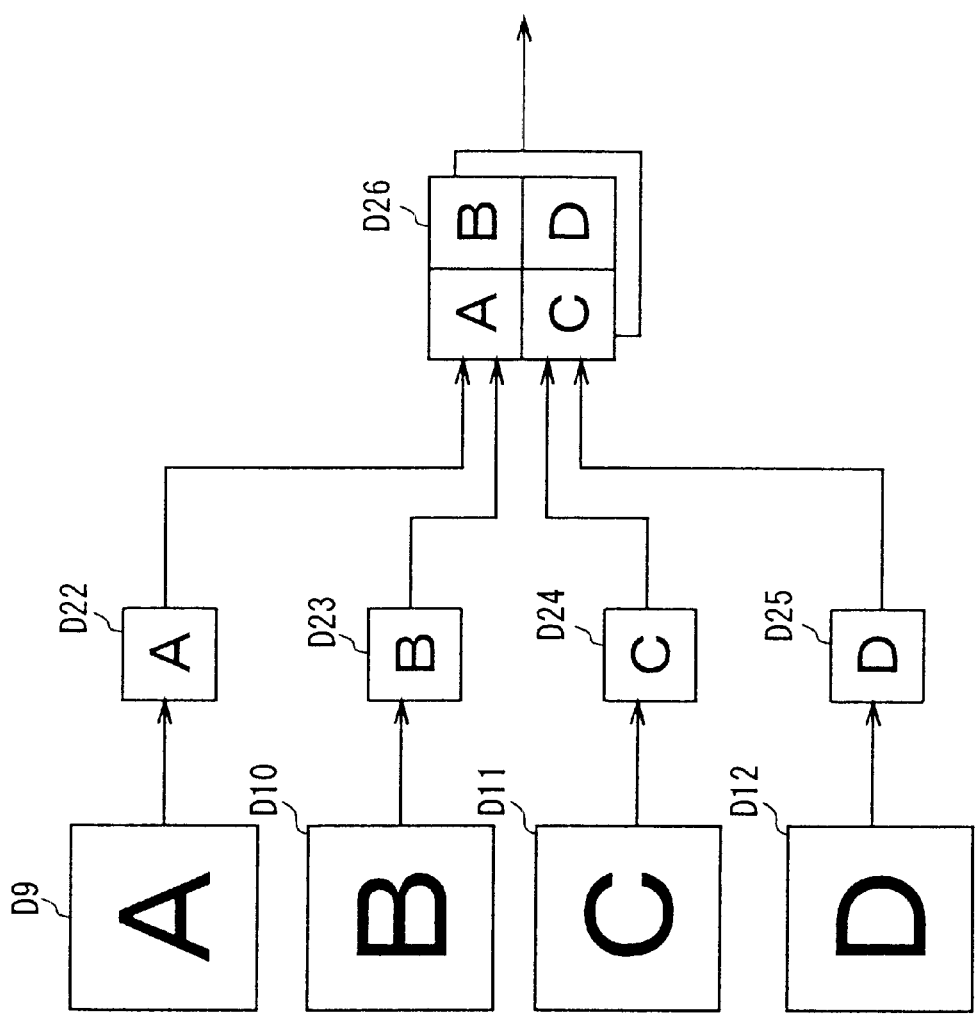
FIG. 6 is a block diagram showing the processing in the encoding part according to the first embodiment.

The first to fourth prefilters 25A to 25D respectively perform thinning-out processing on the first to fourth selected moving image data D9 to D12 to be supplied from the corresponding first to fourth selecting part 10A to 10D, as shown in FIG. 6, to reduce images based on the first to fourth selected moving image data D9 to D12 into halves in the vertical and horizontal directions, that is, to convert resolution into quarter the size of the original images. The first to fourth prefilters 25A to 25D sequentially and respectively transmit obtained first to fourth moving image converted data D22 to D25 to a frame memory 26.

The frame memory 26 sequentially and respectively arranges the first to fourth moving image converted data D22 to D25 to be supplied in prescribed regions: upper-left, upper-right, lower-left and lower-right of the region of the same size as that of the original image, to form images for one field obtained by synthesizing the first to fourth moving image converted data D22 to D25, and writes it by two fields for each frame as frame moving image data D26.

At the same time, for instance, while writing the frame moving image data D26 in the second field of a first frame, the frame memory 26 reads out frame moving image data D26 in the first field of the first frame which is already written and transmits this read-out frame moving image data D26 to an encoder 27.

The encoder 27 performs prescribed encoding processing on the frame moving image data D26 to be supplied, TS-packetizes obtained moving image coded data according to a prescribed format defined by MPEG2 standard, and transmits TS packet stream data D27 obtained by sequentially TS-packetizing the moving image coded data via the transmitting part 5 to the receiving part 6 of the receiver 22.

Figure 7A:
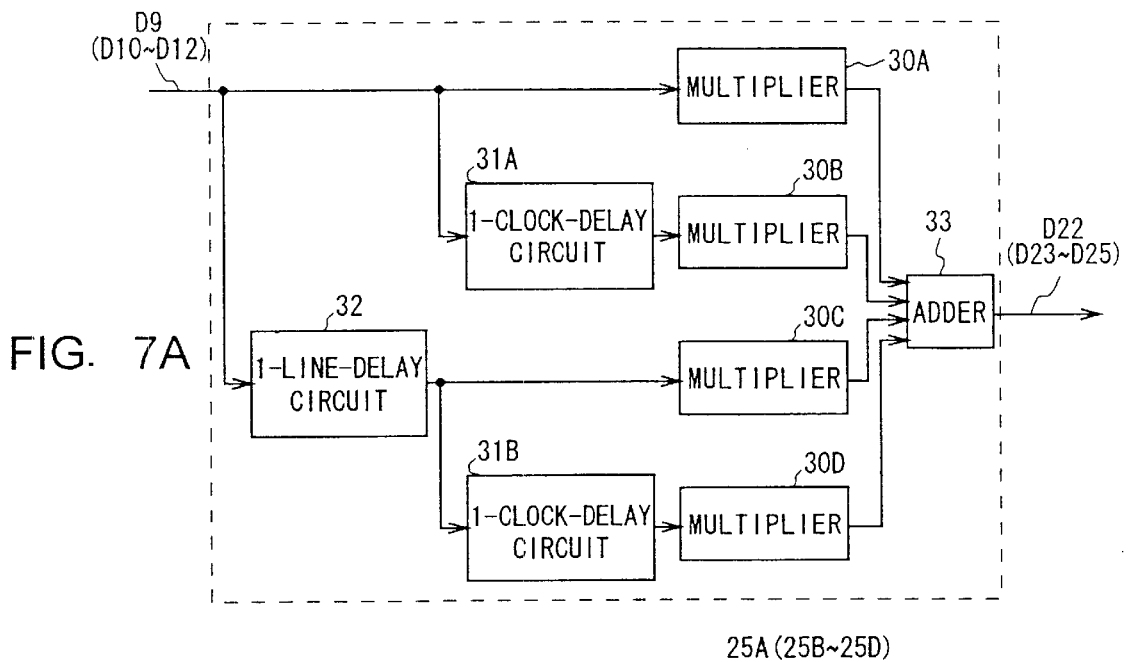
FIGS. 7A and 7B are a block diagram and a conceptual view showing the configuration of a prefilter and its processing according to the first embodiment.

Here, practically, the first to fourth prefilters 25A to 25D are configured as shown in FIG. 7A. The prefilters 25A to 25D input the first to fourth selected moving image data D9 to D12 to be supplied, to a multiplier 30A, a 1-clock-delay circuit 31A and a 1-line-delay circuit 32.

At this time, on the first to fourth selected moving image data D9 to D12 to be supplied, the multiplier 30A sequentially converts only the pixel data values of pixels in even turns in even lines into quarters, among pixel data of time series pixels that form the above first to fourth selected moving image data D9 to D12 respectively, and transmits obtained first multiplied data to an adder 33.

The 1-clock-delay circuit 31A delays the first to fourth selected moving image data D9 to D12 to be supplied for one pixel, and then supplies them to a multiplier 30B. In the multiplier 30B, for the first to fourth selected moving image data D9 to D12 to be supplied, only the pixel data values of pixels in odd turns in even lines, among the pixel data of time series pixels that form the first to fourth selected moving image data D9 to D12 respectively, are converted into quarters, and obtained second multiplied data is transmitted to the adder 33.

The 1-line-delay circuit 32 delays the first to fourth selected moving image data D9 to D12 to be supplied for one line, and then supplies them to a multiplier 30C and a 1-clock-delay circuit 31B.

For the first to fourth selected moving image data D9 to D12 to be supplied, this multiplier 30C sequentially converts only the pixel data values of pixels in even turns in odd lines into quarters, among the pixel data of time series pixels that form the first to fourth selected moving image data D9 to D12 respectively, and transmits obtained third multiplied data to the adder 33.

On the other hand, the 1-clock-delay circuit 31B delays the first to fourth selected moving image data D9 to D12 to be supplied for one clock, and then supplies them to a multiplier 30D. In the multiplier 30D, for the first to fourth selected moving image data D9 to D12 to be supplied, only the pixel data values of pixels in odd turns in odd lines, among the pixel data of time series pixels that form the first to fourth selected moving image data D9 to D12 respectively, are converted into quarters, and obtained fourth multiplied data is transmitted to the adder 33.

Figure 7B:
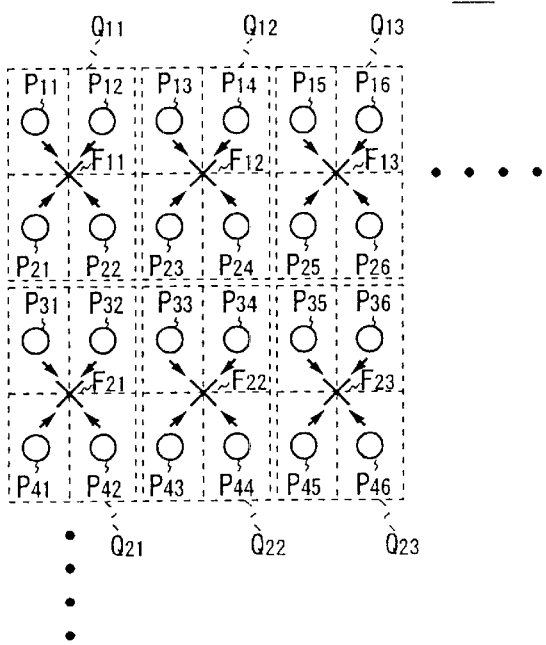

As a result, quarter values of pixel data $P_{22}$, $P_{24}$, $P_{26}$, etc. as the first multiplied data, quarter values of pixel data $P_{21}$, $P_{23}$, $P_{25}$, etc. as the second multiplied data, quarter values of pixel data $P_{12}$, $P_{14}$, $P_{16}$, etc. as the third multiplied data, and quarter values of pixel data $P_{11}$, $P_{13}$, $P_{15}$, etc. as the fourth multiplied data, are respectively supplied to the adder 33, among the pixel data $P_{11}$, $P_{12}$, $P_{21}$, $P_{22}$, etc. of pixels shown in FIG. 7B, that form the first to fourth selected moving image data D9 to D12 to be supplied as the first to fourth multiplied data.

Therefore, the adder 33 adds the first to fourth multiplied data only by such blocks as blocks $Q_{11}$, $Q_{12}$, $Q_{13}$, $Q_{21}$, $Q_{22}$, $Q_{23}$, etc. that are formed of the supplied first to fourth multiplied data. Thus obtained each added data $F_{11}$, $F_{12}$, $F_{13}$, etc. are transmitted to the frame memory 26 as the first to fourth moving image converted data D22 to D25.

Figure 3:
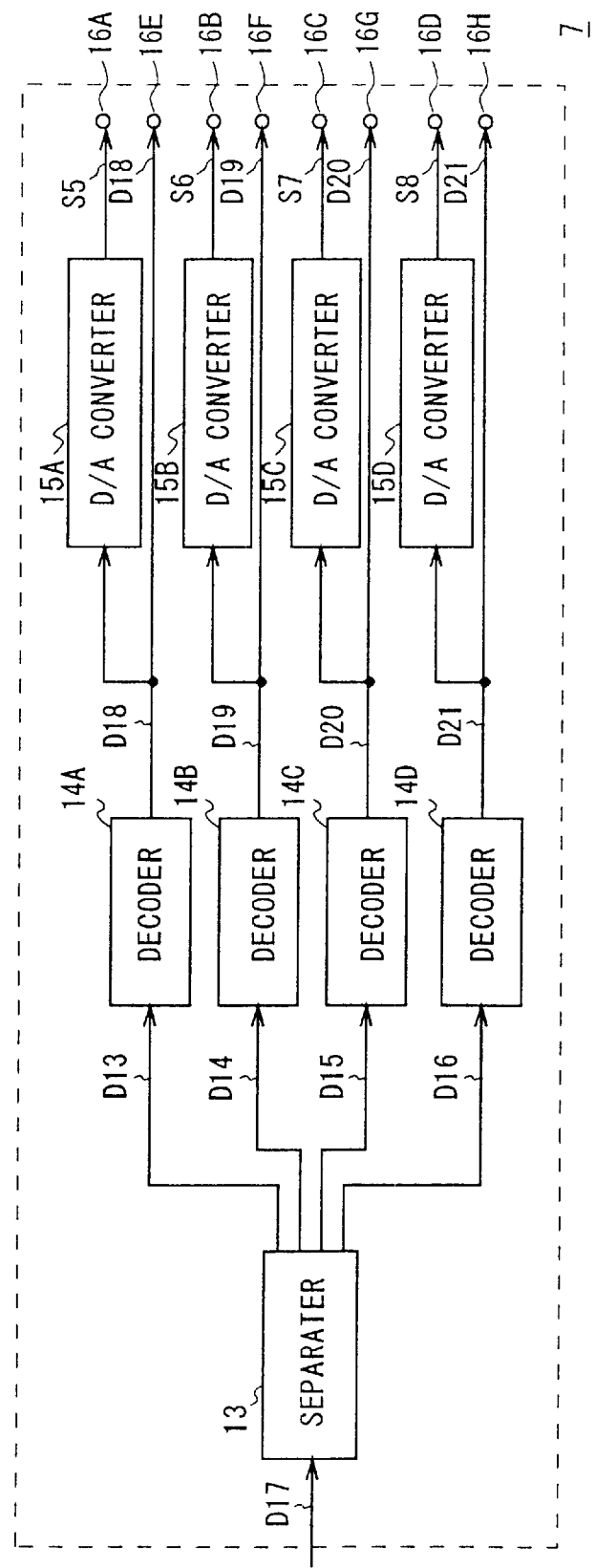
FIG. 3 is a block diagram showing the configuration of a conventional decoding part.
Figure 8:
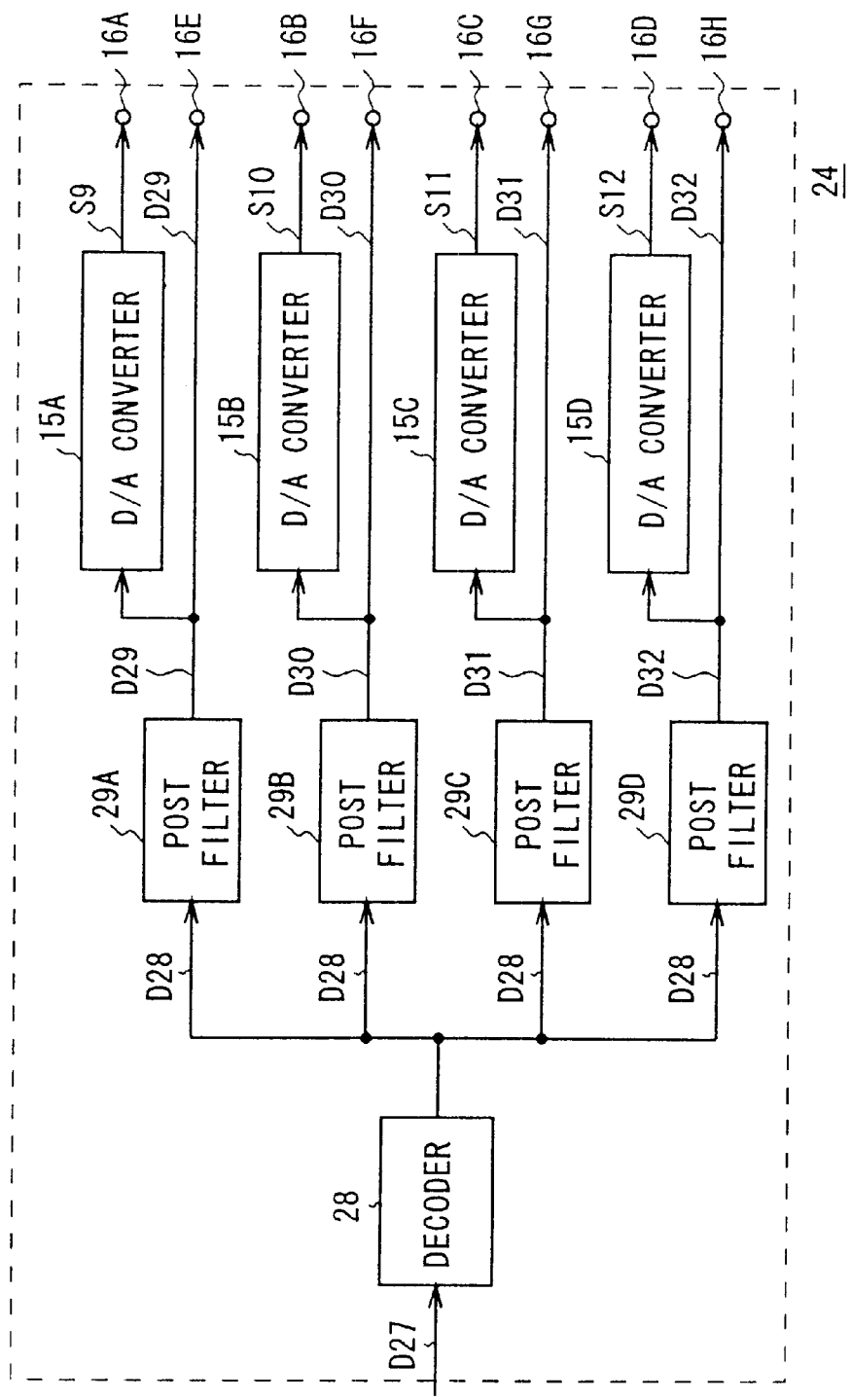
FIG. 8 is a block diagram showing the configuration of a decoding part according to the first embodiment.

The decoding part 24 of the receiver 22 is configured as shown in FIG. 8 in which the same reference numerals are added to corresponding parts of FIG. 3. The decoding part 24 supplies TS packet stream data D27 outputted from the receiving part 6 to a decoder 28.

The decoder 28 separates the TS packet stream data D27 to be supplied from the receiving part 6 according to a format defined by the MPEG2 standard, performs prescribed decoding processing on moving image coded data obtained by sequentially separating the above TS packet stream data D27, and respectively transmits obtained frame moving image reproducing data D28 to first to fourth post filters 29A to 29D.

Figure 9:
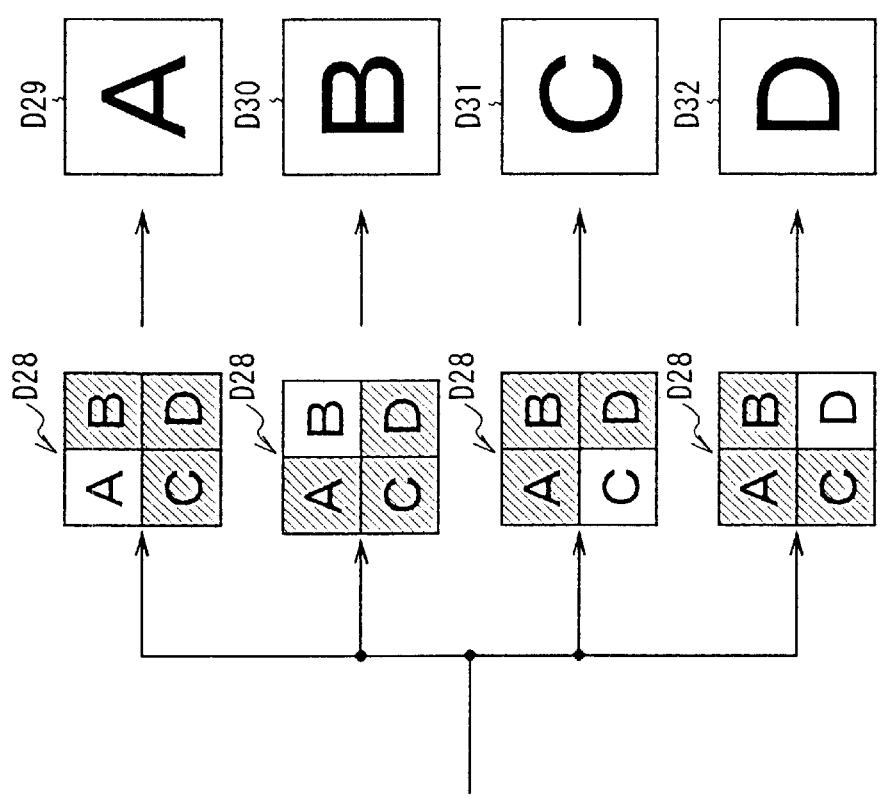
FIG. 9 is a block diagram showing the processing in the decoding part according to the first embodiment.

As shown in FIG. 9, for the frame moving image reproducing data D28 to be supplied, the first to fourth post filters 29A to 29D perform interpolation processing, to selectively take out corresponding images from among images based on the frame moving image reproducing data D28, and magnify them twice in the vertical and horizontal directions, that is, to perform resolution conversion into four times of the original image. And the first to fourth post filters 29A to 29D transmit obtained first to fourth moving image reproducing data D29 to D32 composed of different images to corresponding first to fourth D/A converters 15A to 15D as well as outputting the first to fourth moving image reproducing data D29 to D32 to the external device as they are via corresponding first to fourth digital output terminals 16E to 16H.

The first to fourth D/A converters 15A to 15D perform analog conversion on the first to fourth moving image reproducing data D29 to D32 to be supplied to output them to the external device as first to fourth moving image reproducing signals S9 to S12 in analog waveform via first to fourth analog output terminals 16A to 16D.

Figure 10A:
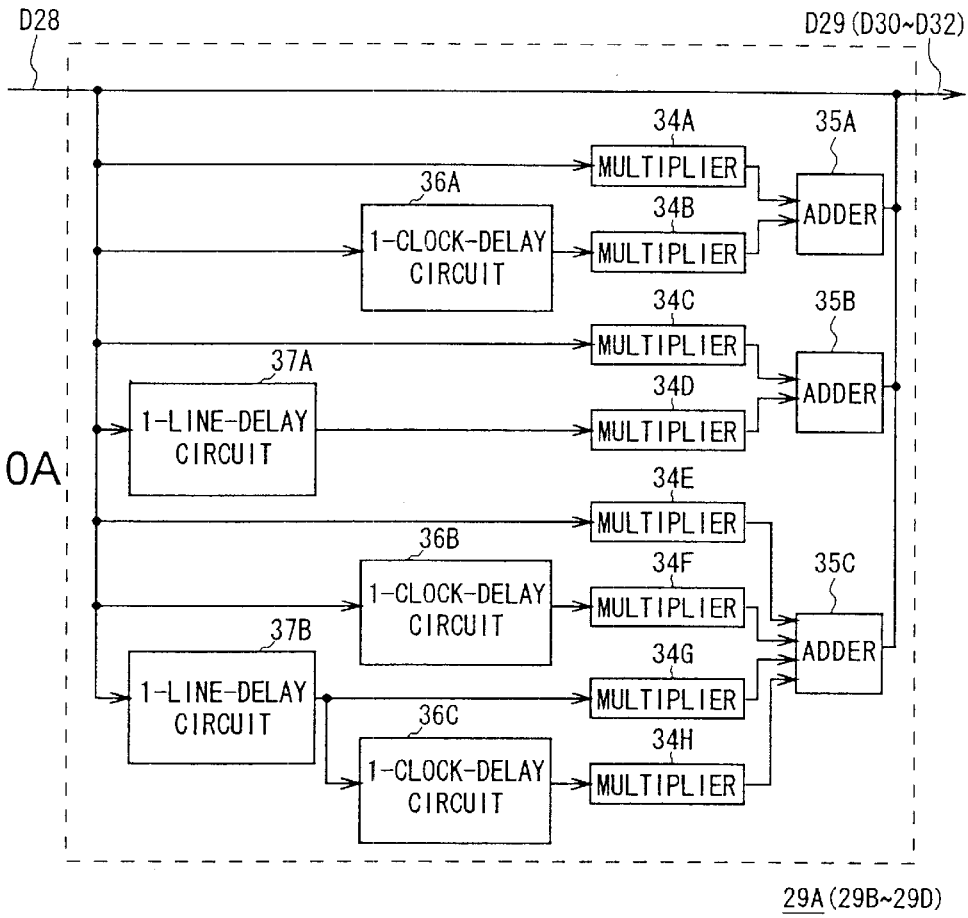
FIGS. 10A and 10B are a block diagram and a conceptual view showing the configuration of a post filter and its processing according to the first embodiment.

Practically, the first to fourth post filters 29A to 29D are configured as shown in FIG. 10A. The post filters 29A to 29D output the frame moving image reproducing data D28 to be supplied as it is as first interpolated pixel data while supplying the above frame moving image reproducing data D28 to a multiplier 34A, a 1-clock-delay circuit 36A, a multiplier 34C, a 1-line-delay circuit 37A, a multiplier 34E, a 1-clock-delay circuit 36B and a 1-line-delay circuit 37B.

At this time, on the frame moving image reproducing data D28 to be supplied, the multiplier 34A converts the pixel data values of each time series pixel that form the above frame moving image reproducing data D28 into halves, and transmits obtained first converted data to an adder 35A.

On the other hand, the 1-clock-delay circuit 36A delays the frame moving image reproducing data D28 to be supplied for one clock, and then sends this to a multiplier 34B. In the multiplier 34B, the pixel data values of each time series pixel that form the above frame moving image reproducing data D28 into halves, and obtained second converted data is transmitted to the adder 35A.

Figure 10B:
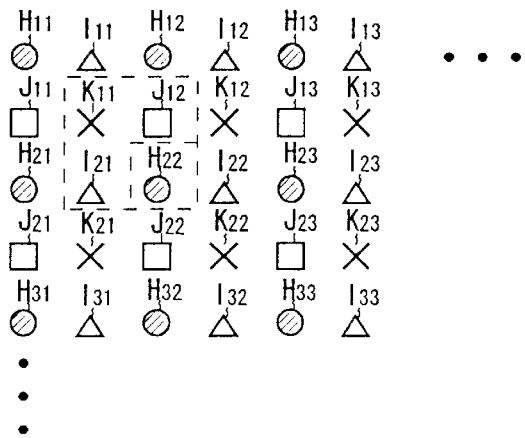

As a result, the values obtained by converting the values of pixel data $H_{11}$, $H_{12}$, $H_{21}$, $H_{22}$, etc. that form the frame moving image reproducing data D28 into halves, as shown in FIG. 10B, are supplied to the adder 35A as the first and second converted data.

And the adder 35A sequentially adds the first and second converted data to be supplied, and outputs pixel data $I_{11}$, $I_{12}$, $I_{13}$, etc. that are obtained by interpolating pixel data adjacent to each other on each line (e.g., the pixel data $H_{11}$ and $H_{12}$), among the pixel data $H_{11}$, $H_{12}$, $H_{13}$, $H_{21}$, $H_{22}$, $H_{23}$, etc., of each pixel that form the frame moving image reproducing data D28, as second interpolated pixel data.

For the frame moving image reproducing data D28 to be supplied, the multiplier 34C converts the pixel data values of time series pixels that form the above frame moving image reproducing data D28 into halves, and transmits obtained third converted data to an adder 35B.

On the other hand, the 1-line-delay circuit 37A delays the frame moving image reproducing data D28 to be supplied for one line, and then sends this to a multiplier 34D. In the multiplier 34D, the pixel data values of time series pixels that form the above frame moving image reproducing data D28 are converted into halves, and Obtained fourth converted data is transmitted to the adder 35B.

As a result, the values obtained by converting the values of the pixel data $H_{11}$, $H_{12}$, $H_{21}$, $H_{22}$, etc. (FIG. 10B), of pixels that form the frame moving image reproducing data D28 into halves, are supplied to the adder 35B as the third and fourth converted data.

And the adder 35B sequentially adds the third and fourth converted data to be supplied, and outputs pixel data $J_{11}$, $J_{12}$, $J_{13}$, etc. (FIG. 10B), that are obtained by interpolating pixel data adjacent to each other for each line (e.g., the pixel data $H_{11}$ and $H_{21}$ (FIG. 10B)), among the pixel data $H_{11}$, $H_{12}$, $H_{13}$, $H_{21}$, $H_{22}$, $H_{23}$, etc. (FIG. 10B), of pixels that form the frame moving image reproducing data D28, as third interpolated pixel data.

For the frame moving image reproducing data D28 to be supplied, the multiplier 34E converts the pixel data values of time series pixels that form the above frame moving image reproducing data D28 into quarters, and transmits obtained fifth converted data to an adder 35C.

On the other hand, the 1-clock-delay circuit 36B delays the frame moving image reproducing data D28 to be supplied for one clock, and then sends this to a multiplier 34F. In the multiplier 34F, the pixel data values of time series pixels that form the above frame moving image reproducing data D28 are converted into quarters, and obtained sixth converted data is transmitted to the adder 35C.

At this time, the 1-line-delay circuit 37B delays the frame moving image reproducing data D28 to be supplied for one line, and then sends this to a multiplier 34G and a 1-clock-delay circuit 36C. In the multiplier 34G, the pixel data values of time series pixels that form the frame moving image reproducing data D28 are converted into quarters, and obtained seventh converted data is transmitted to the adder 35C.

At the same time, the 1-clock-delay circuit 36C delays the frame moving image reproducing data D28 to be supplied for one clock, and then sends this to a multiplier 34H. In the multiplier 34H, the pixel data values of time series pixels that form the above frame moving image reproducing data D28 are converted into quarters, and obtained eighth converted data is transmitted to the adder 35C.

As a result, the values obtained by converting the values of the pixel data $H_{11}$, $H_{12}$, $H_{21}$, $H_{22}$, etc. that form the frame moving image reproducing data D28 (FIG. 10B) into quarters, are supplied to the adder 35C as the fifth to eighth converted data.

And the adder 35C sequentially adds the fifth to eighth converted data supplied, and outputs pixel data $K_{11}$, $K_{12}$, $K_{13}$, $K_{21}$, $K_{22}$, $K_{23}$, etc. (FIG. 10B), that are obtained by interpolating respectively pixel data adjacent to each other for each line (e.g., the pixel data $H_{11}$ and $H_{12}$, etc. (FIG. 10B)), and pixel data adjacent to each other for each line (e.g., the pixel data $H_{11}$, $H_{21}$ (FIG. 10B)), among the pixel data $H_{11}$, $H_{12}$, $H_{21}$, $H_{22}$, etc. (FIG. 10B), that form the frame moving image reproducing data D28, as fourth interpolated pixel data.

Accordingly, the first to fourth post filters 29A to 29D transmit the image formed by the pixel data $H_{11}$ . . . , $I_{11}$ . . . , $J_{11}$ . . . , $K_{11}$ . . . , etc., (FIG. 10B) as these first to fourth interpolated pixel data to the first to fourth D/A converters 15A to 15D and the corresponding first to fourth digital output terminals 16E to 16H, as the first to fourth moving image reproducing data D29 to D32.

(2) Operation and Effects According to First Embodiment

According to the above configuration, in this transmitter 21, thinning-out processing in which the images based on the first to fourth selected moving image data D9 to D12 are converted into halves in resolution in the vertical and horizontal directions, is performed by using the first to fourth prefilters 25A to 25D. And the obtained first to fourth moving image converted data D22 to D25 are arranged sequentially and respectively by four in a predetermined state in the frame memory 26 so that moving images for one field that have been synthesized in the same size as the first to fourth selected moving image data D9 to D12 are formed, and they are encoded as the frame moving image data D26.

Furthermore, in this receiver 22, in the decoder 28, the TS packet stream data D27 to be supplied is separated, and corresponding images are selectively taken in from among the images based on thus obtained frame moving image reproducing data D28 using the corresponding first to fourth post filters 29A to 29D, and the above images are subjected to interpolation processing in which the above images are converted in resolution in the vertical and horizontal directions, so that the first to fourth moving image reproducing data D29 to D32 are obtained.

Accordingly, in this transmitter-receiver 20, in the transmitter 21, four selected moving image data D9 to D12 are synthesized and encoded as one frame moving image data D26, so that re-multiplex processing is unnecessary and the encoder 27 can be composed of one circuit. In addition, since in the receiver 22 only one TS packet stream data D27 is decoded, the decoder 28 can be composed of one circuit.

According to the above configuration, in this transmitter-receiver 20, in the transmitter 21, thinning-out processing in which resolution is converted into halves in the vertical and horizontal directions is applied to an image based on a plurality of image data supplied from an external device to the transmitter, and the resultant data are synthesized to sequentially be arranged by four in a predetermined state, and obtained frame moving image data D26 is encoded. The receiving end separates the image data supplied from the transmitter, takes in the corresponding images selectively from among the images based on the separated image data. And the obtained images are subjected to interpolation processing which converts resolution twice in the horizontal and vertical directions. As a result, there is no need for re-multiplex processing so that the encoder 27 can be composed of only one circuit. Further, only one image data is decoded so that the decoder 28 can be composed of only one circuit. Thus, it is possible to provide a transmitter-receiver in which the size of the circuit is remarkably reduced and simplified.

(3) Configuration of Transmitter-Receiver according to Second Embodiment

Figure 11:
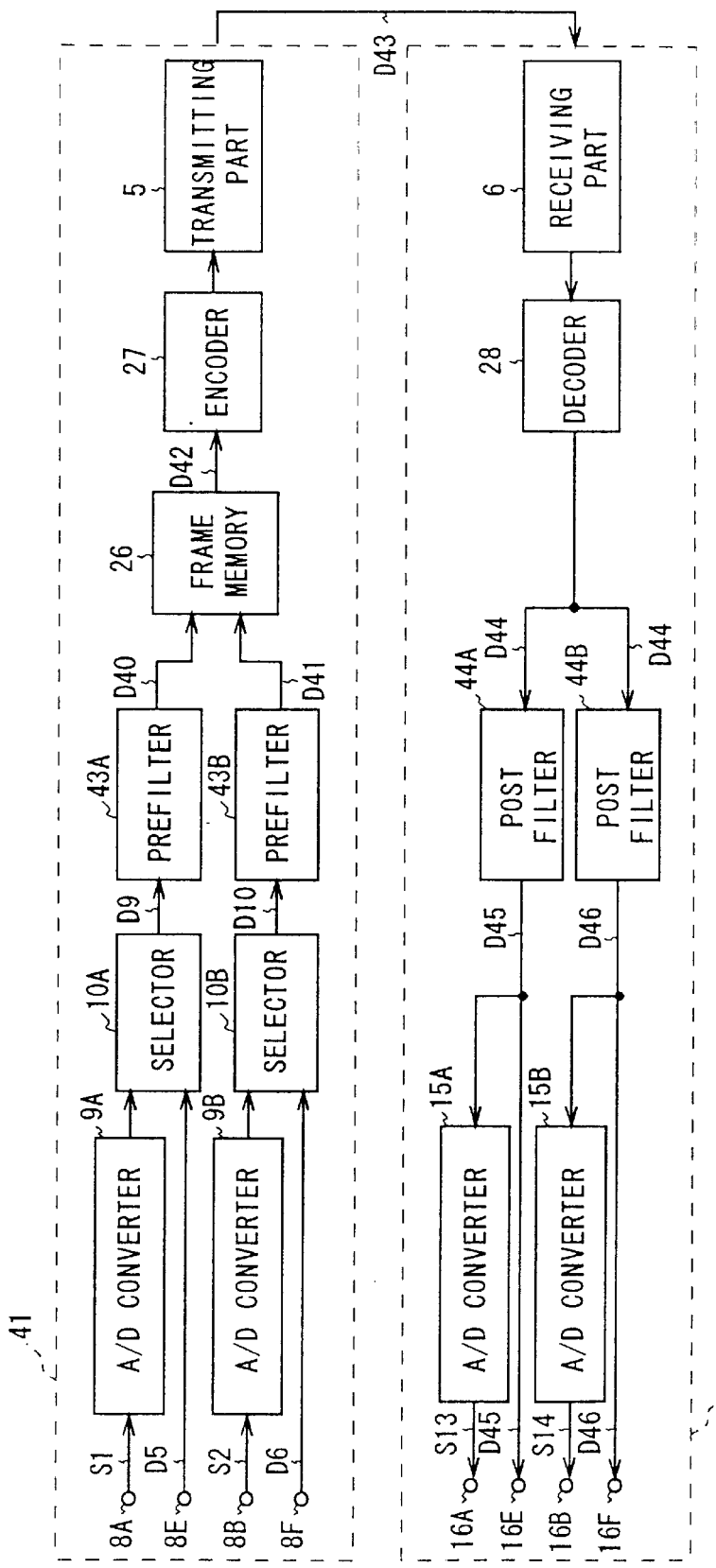
FIG. 11 is a block diagram showing the configuration of a transmitter-receiver according to a second embodiment.

Referring to FIG. 11 in which the same reference numerals are added to corresponding parts of FIGS. 5 and 8, 40 shows a transmitter-receiver according to a second embodiment. A transmitter 41 is configured similar to the transmitter 21 (FIG. 4) according to the first embodiment, except for those points that the third and fourth analog input terminals 8C and 8D, the third and fourth digital input terminals 8G and 8H, the third and fourth A/D converters 9C and 9D, the third and fourth selecting parts 10C and 10D and the third and fourth prefilters 25C and 25D (FIG. 5) are omitted from the composition shown in FIG. 5 and a first prefilter 43A and a second prefilter 43B (FIG. 11) are different in configuration from those in FIG. 5.

And a receiver 42 is configured similar to the receiver 22 (FIG. 4) according to the first embodiment, except for those points that the third and fourth post filters 29C and 29D, the third and fourth D/A converters 1SC and 15D, the third and fourth analog output terminals 16C and 16D and the third and fourth digital output terminals 16G and 16H (FIG. 8) are omitted from the composition shown in FIG. 8 and a first post filter 44A and a second post filter 44B (FIG. 11) are different in configuration from those in FIG. 8.

Figure 12A:
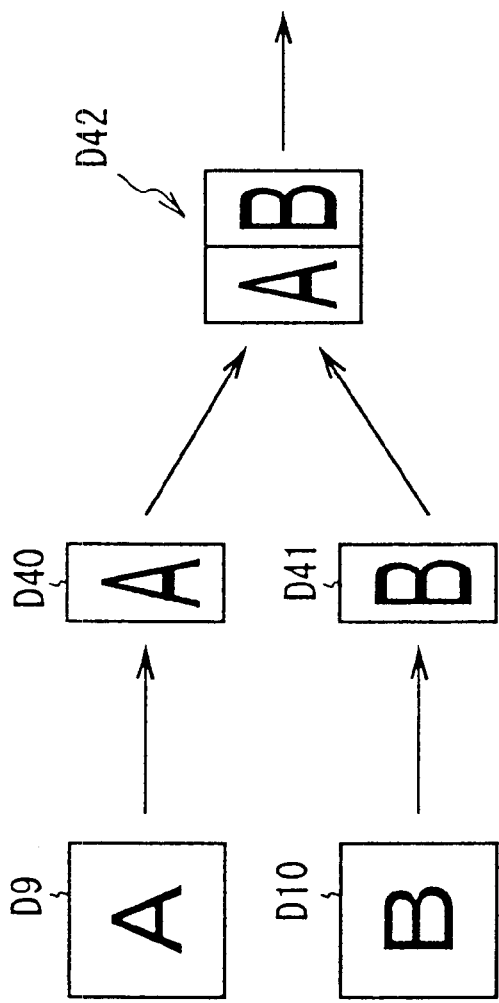
FIG. 12 is a block diagram showing the processing in the transmitter-receiver according to the second embodiment.
Figure 12B:
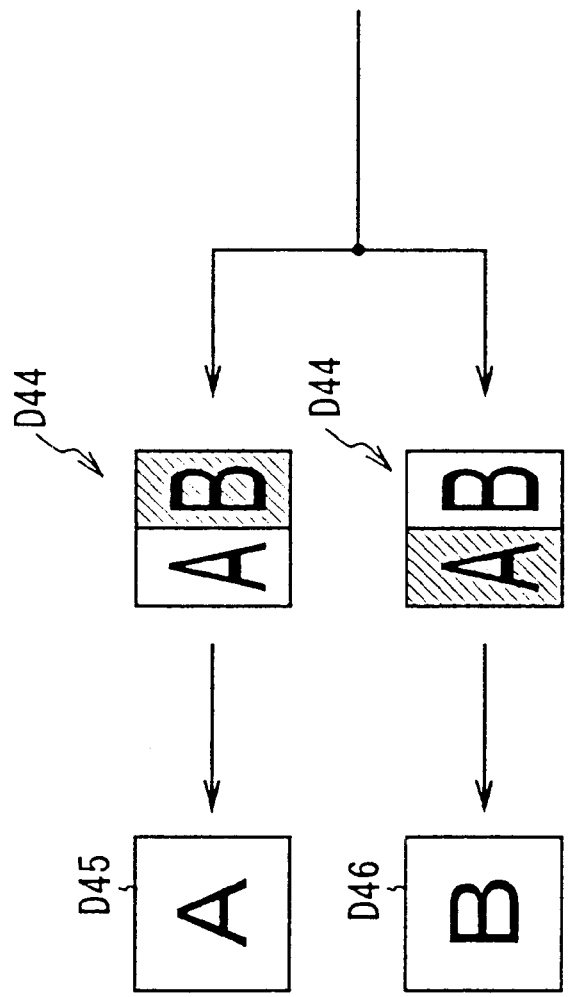

Practically, as shown in FIG. 12, the first and second prefilters 43A and 43B perform thinning-out processing on first and second selected moving image data D9 and D10 that are supplied from corresponding first and second selecting parts 10A and 10B, to reduce images based on the above first and second selected moving image data D9 and D10 to halves in the horizontal direction, and transmit obtained first and second moving image converted data D40 and D41 to a frame memory 26.

The frame memory 26 sequentially arranges the first and second moving image converted data D40 and D41 to be supplied in left and right sides of an area having the same size as the original images, forms the image for one field obtained by synthesizing the first and second moving image converted data D40 and D41, and writes it by two fields per frame as frame moving image data D42.

In addition, for instance, while writing frame moving image data D42 in the second field of first frame, the frame memory 26 reads out already-written frame moving image data D42 in the first field of first frame, and transmits read-out frame moving image data D42 to an encoder 27.

The encoder 27 performs prescribed encoding processing on the frame moving image data D42 to be supplied, TS-packetizes obtained moving image coded data according to the format defined by MPEG2 standard, and transmits TS packet stream data D43 that is obtained by sequentially TS-packetizing the above moving image coded data via a transmitting part 5 to the receiving part 6 of the receiver 42.

The receiving part 6 transmits the TS packet stream data D43 to be supplied to a decoder 28. The decoder 28 separates the TS packet stream data D43 to be supplied according to the format defined by MPEG2 standard, performs prescribed decoding processing on moving image coded data that is obtained by sequentially separating the TS packet stream data D43, and transmits obtained frame moving image reproducing data D44 to the first and second post filters 44A and 44B.

As shown in FIG. 12, the first and second post filters 44A and 44B, for the frame moving image reproducing data D44, selectively takes out the corresponding image from among the images based on the first moving image reproducing data D44, and perform interpolation processing on them to convert resolution twice in the horizontal direction. The first and second post filters 44A and 44B transmit obtained first and second moving image reproducing data D45 and D46 composed of respectively different images to corresponding first and second D/A converters 15A and 15B, and also output the above first and second moving image reproducing data D45 and D46 to the external device as they are via corresponding first and second digital output terminals 16E and 16F as well.

The first and second D/A converters 15A and 15B perform analog conversion on the first and second moving image reproducing data D45 and D46 to be supplied, and output them to the external device via corresponding first and second analog output terminals 16A and 16B, as first and second moving image reproducing signals S13 and S14 in analog waveform.

(4) Operation and Effects according to Second Embodiment

According to the above configuration, in this transmitter 41, thinning-out processing to reduce pixel data that form the first and second selected moving image data D9 and D10 into halves only in the horizontal direction using the first and second prefilters 43A and 43B, that is, to convert resolution into halves of the original images, is performed. The obtained first and second moving image converted data D40 and D41 are sequentially arranged side by side in a specified state, and a moving image for one field obtained by synthesizing in the same size as the first and second selected moving image data D9 and D10 is formed. Then, this image is encoded as frame moving image data D42.

On the other hand, in this receiver 42, in the decoder 28, interpolation processing to separate the TS packet stream data D43 to be supplied, selectively take out corresponding moving image converted reproducing data using the corresponding first and second post filters 44A and 44B from among moving image converted reproducing data forming obtained frame moving image reproducing data D44, and perform magnification on each moving image converted reproducing data only in the horizontal direction, that is, to convert resolution on the image data twice, so that the first and second moving image reproducing data D45 and D46 are obtained.

Accordingly, in this transmitter-receiver 40, it is possible to lessen the deterioration of image quality owing to the thinning-out processing performed in the transmitter 41 on the pixel data that form the two selected moving image data D9 and D10 and the interpolation processing performed in the receiver 42 on corresponding moving image converted reproducing data among the moving image converted reproducing data that form the frame moving image reproducing data D44.

According to the above configuration, in this transmitter-receiver 40, the transmitter performs thinning-out processing on the pixels based on the moving image data supplied from the exterior to convert resolution into halves only in the horizontal direction, synthesizes them in order to sequentially arrange in a predetermined state and encodes them. The receiver selectively takes out corresponding moving image data from among image data obtained by separating image data supplied from the transmitter, and performs interpolation processing on it to convert resolution twice only in the horizontal direction. Which results in less deterioration of image data due to the thinning-out processing for pixel data and interpolation processing, so that an image quality can be improved. In this way, it is possible to provide a transmitter-receiver with much small-sized and simplified circuitry.

(5) Other Embodiments

Figure 13:
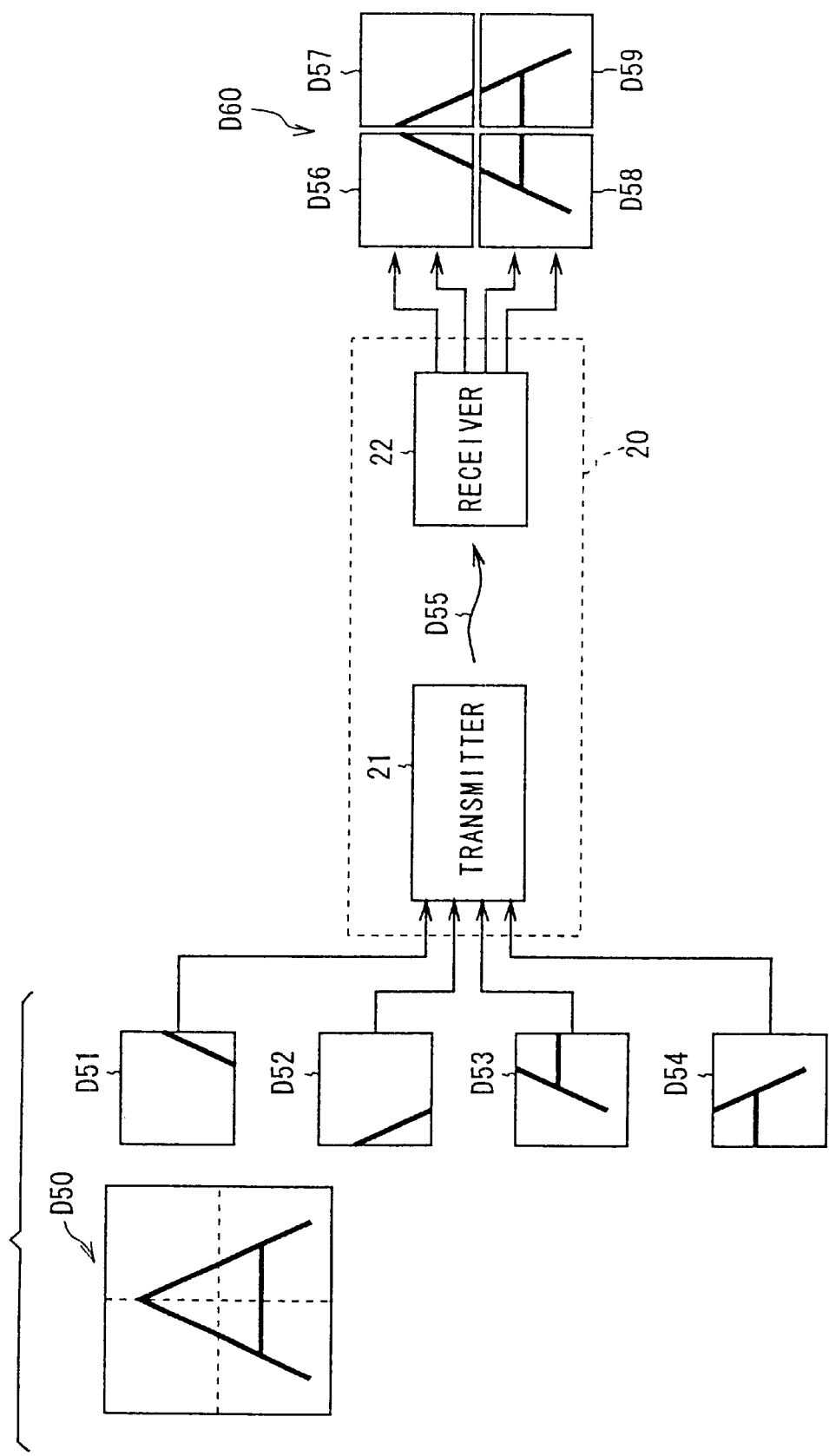
FIG. 13 is a block diagram showing the processing in a transmitter-receiver according to another embodiment.

According to the aforementioned first embodiment, the description has been given of the transmitter-receiver 20 (FIG. 4) for transmitting/receiving the first to fourth moving image signals S1 to S4 or the fifth to eighth moving image data D5 to D8 that are composed of different moving images as first image data supplied from an external device. However, the present invention is not limited to this. For instance, as shown in FIG. 13, it is also possible to transmit first to fourth moving image data D51 to D54 that are formed by dividing moving image data D50 composed of one moving image into four as TS packet stream data D55 using the transmitter 21, and to produce moving image reproducing data D60 that are formed of four into first to fourth moving image divided reproducing data D56 to D59 received by the receiver 22.

Figure 14:
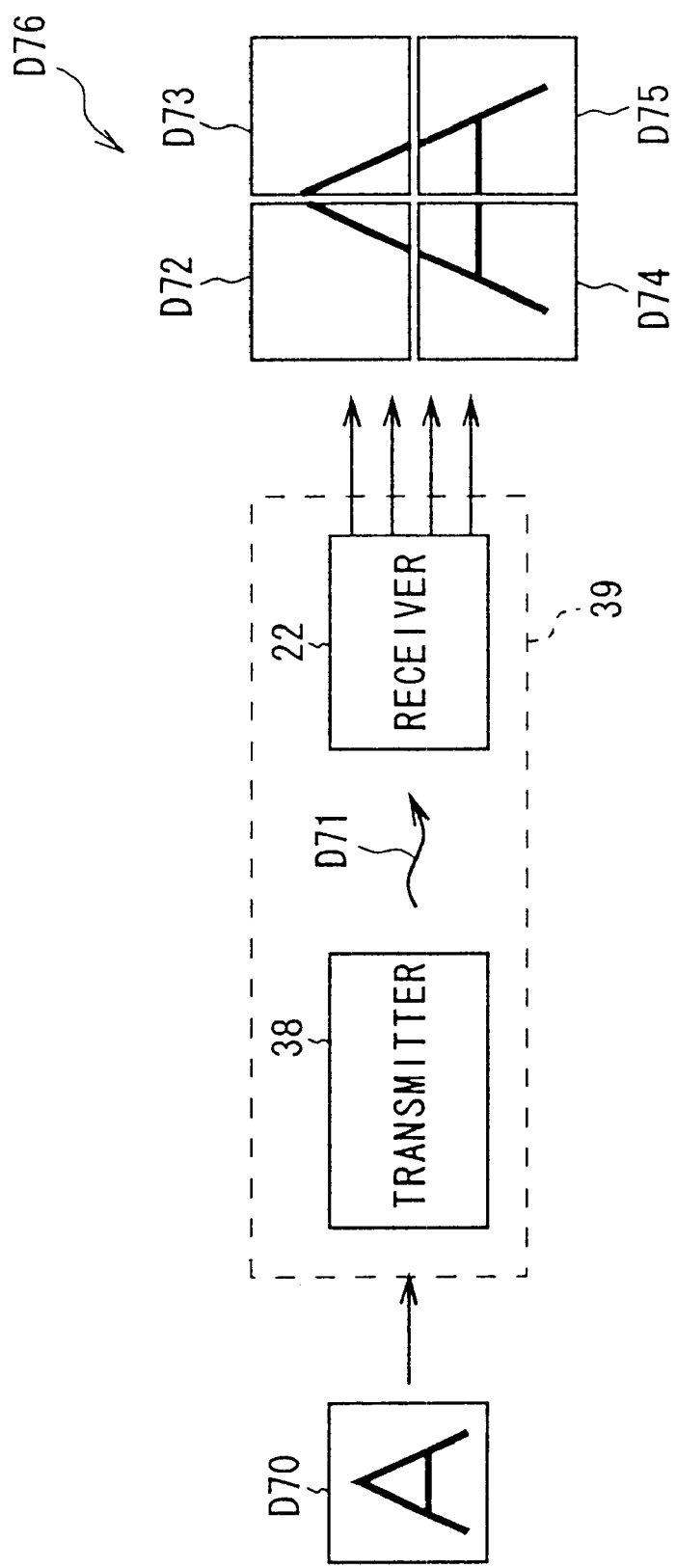
FIG. 14 is a block diagram showing the processing in a transmitter-receiver according to another embodiment.

According to the aforementioned first embodiment, the description has been given of the transmitter-receiver 20 (FIG. 4) for transmitting/receiving the first to fourth moving image signals S1 to S4 or the fifth to eighth moving image data D5 to D8 that are composed of different moving images. However, the present invention is not limited to this. For instance, as shown in FIG. 14, it is also possible to reproduce moving image reproducing data D76 that are formed of first to fourth moving image divided reproducing data D72 to D75 which are obtained by transmitting moving image data D70 that is composed of one moving image with a 1-channel transmitter 38 of a conventional type of the transmitter-receiver 39 (FIG. 2) as multiplex data D71 and receiving the multiplex data D71 by the receiver 22.

Furthermore, according to the aforementioned first embodiment, the description has been given of the case where the present invention is applied to the transmitter-receiver 20 (FIG. 4) composed of the 4-channel transmitter 21 and receiver 22 as a transmitter-receiver. However, the present invention is not limited to this. The point is that, as long as the transmitter-receiver has a configuration with a multi-channel transmitter and receiver, it can be applied to, for example, a transmitter-receiver 40 (FIG. 11) with the transmitter 41 and the receiver 42 having 2-channel in the aforementioned second embodiment, and also applied widely to various other configurations.

According to the aforementioned first embodiment, the description has been given of the case of using the two first and second 1-clock-delay circuits 31A and 31B (FIG. 7A) in the first to fourth prefilters 25A to 25D as resolution conversion processing means. However, the present invention is not limited to this. The point is that, as long as the resolution conversion processing means reduces the image size of a plurality of image data in the vertical or horizontal direction, the first and second 1-clock-delay circuits 31A and 31B can commonly be used. This configuration much more simplifies the configuration of the first to fourth prefilters 25A to 25D.

According to the aforementioned embodiments, the description has been given of the case of using the third to fifth 1-clock-delay circuits 36A to 36C and the second and third 1-line-delayed circuits 37A and 37B (FIG. 10A) in the first to fourth post filters 29A to 29D as image separating means. However, the present invention is not limited to this. The point is that, as long as the first to fourth post filters separate the TS packet stream data D27 as first image data into frame moving image reproducing data D28 as a plurality of second image data, the third to fifth 1-clock-delay circuits 36A to 36C and the second and third 1-line-delay circuits 37A and 37B can be in common use in the image data separating means. This configuration much more simplifies the configuration of the first to fourth post filters 29A to 29D.

Moreover, according to the aforementioned embodiments, the description has been given of the case where the present invention is applied to the transmitter-receiver 20, 40 and the moving image information S1 to S4 or the moving image data D5 to 8B, that are to be supplied, are transmitted/received by using the transmitter 21, 41 and the receiver 22, 42. However, the present invention is not limited to this. It is also possible to record/reproduce transmission data by using, for example, a hard-disk device, and retransmit/receive it by using a network or the like. As the configuration of a transmitter-receiver and as a transmitting/receiving method, various configurations and methods can be applied.

According to the present invention as described above, since a transmitter is provided with: a resolution conversion processing means for performing prescribed resolution conversion processing on plural first image data to be supplied to reduce the image size in the vertical direction and/or horizontal direction respectively a synthesized image generating means for generating second image data that is composed of image data for one image, based on each of the first image data subjected to the resolution conversion processing; an encoding means for performing prescribed encoding processing on the second image data; and a transmitting means for transmitting the second image data subjected to the encoding processing. Thereby, it is possible to cover the whole encoding processing by one circuit. Thus, it is possible to provide a transmitter in which the circuitry is remarkably reduced and simplified.

According to the present invention, since a receiver is provided with: a receiving means for receiving first image data to be transmitted from a transmitter; a decoding means for performing prescribed decoding processing on the first image data; an image data separating means for separating the first image data subjected to the decoding processing into plural second image data; and a resolution conversion processing means for performing prescribed resolution conversion processing on each of the second image data to magnify the image size in the vertical direction and/or horizontal direction. Thereby, it is possible to perform the whole encoding processing by only one circuit. Thus, it is possible to provide a receiver which can considerably reduce and simplify the circuitry.

According to the present invention, since a transmitter-receiver is provided with: a resolution conversion processing means for performing prescribed resolution conversion processing on plural first image data to be supplied, to reduce the image size in the vertical direction and/or horizontal direction respectively; a synthesized image generating means for generating second image data that is composed of image data for one frame, based on each of the first image data subjected to the resolution conversion processing; an encoding means for performing prescribed encoding processing on the second image data; a transmitting means for transmitting the second image data subjected on the encoding processing; a receiving means for receiving the second image data to be transmitted from a transmitter; a decoding means for performing prescribed decoding processing on the second image data; an image data separating means for separating the second image data subjected to the decoding processing into plural third image data; and a resolution conversion processing means for performing prescribed resolution conversion processing on each of the third image data to magnify the image size in the vertical direction and/or horizontal direction respectively, each of encoding processing in the transmitter and the decoding processing in the receiver can be performed by only one circuit. Thus, it is possible to provide a transmitter-receiver which can considerably reduce and simplify the circuitry.

According to the present invention, a transmitting method comprises: a first step of performing prescribed resolution conversion processing on plural first image data to be supplied, to reduce the image size in the vertical direction and/or horizontal direction respectively; a second step of generating second image data that is composed of image data for one frame based on each of the first image data subjected to the resolution conversion processing; a third step of performing prescribed encoding processing on the second image data; and a fourth step of transmitting the second image data subjected to the encoding processing. Thereby, the encoding processing can be performed in only one circuit. Thus, it is possible to provide a transmitting method that can remarkably reduce and simplify the circuitry.

According to the present invention, a receiving method comprises: a first step of receiving first image data to be transmitted from a transmitter; a second step of performing prescribed decoding processing on the first image data; a third step of separating the first image data subjected to the decoding processing into plural second image data; a fourth step of performing prescribed resolution conversion processing on each of the second image data, to magnify the image size in the vertical direction and/or horizontal direction respectively. Thereby, the decoding processing can be performed in only one circuit. Thus, it is possible to provide a receiving method that can remarkably reduce and simplify the circuitry.

Furthermore, according to the present invention, a transmitting/receiving method comprises: a first step of performing prescribed resolution conversion processing on plural first image data to be supplied to reduce the image size in the vertical direction and/or horizontal direction respectively; a second step of generating second image data that is composed of image data for one frame, based on each of the first image data subjected to the resolution conversion processing; a third step of performing prescribed encoding processing on the second image data; a fourth step of transmitting the second image data subjected to the encoding processing; a fifth step of receiving the second image data to be transmitted from a transmitter; the sixth step of performing prescribed decoding processing on the second image data; the seventh step of separating the second image data subjected to the decoding processing into plural third image data; and the eighth step of performing prescribed resolution conversion processing on each of the third image data to magnify the image size in the vertical direction and/or horizontal direction respectively. Thereby, each of encoding processing in the transmitter and the decoding processing in the receiver can be performed in only one circuit. Thus, it is possible to provide a transmitting/receiving method that can remarkably reduce and simplify the circuitry.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter for encoding and transmitting a plurality of image data channels as an encoded data stream, comprising:
   a plurality of prefilters corresponding to said plurality of image data channels for reducing the resolution of each image in said plurality of image data channels;
   a frame memory for sequentially arranging the resolution reduced images output from said plurality of prefilters into a full resolution frame;
   an encoder for encoding the full resolution frame into said encoded data stream; and
   a transmitter for transmitting said encoded data stream.

2. The transmitter according to claim 1, further comprising:
   a plurality of analog input ports corresponding to said plurality of image data channels for inputting image data channels in analog format;
   a plurality of converters for converting image data channels input to said plurality of analog input ports in analog format to digital format;
   a plurality of digital input ports corresponding to said plurality of image data channels for inputting image data channels in digital format; and
   a plurality of selectors corresponding to said plurality of image data channels for selecting between said plurality of analog input ports and said plurality of digital input ports; thereby allowing said plurality of image data channels to be input in either analog or digital format.

3. The transmitter according to claim 1, wherein said plurality of prefilters reduce the resolution of each image by half in both a horizontal direction and a vertical direction, whereby said full resolution frame is formed of four resolution reduced images.

4. The transmitter according to claim 3, wherein said transmitter transmits four image data channels.

5. The transmitter according to claim 1, wherein said plurality of prefilters reduce the resolution of each image by half in a horizontal direction, whereby said full resolution frame is formed of two resolution reduced images.

6. The transmitter according to claim 5, wherein said transmitter transmits two image data channels.

7. A method of encoding and transmitting a plurality of image data channels as an encoded data stream, comprising the steps of:

reducing the resolution of each image in said plurality of image data channels using a plurality of prefilters corresponding to said plurality of image data channels;

sequentially arranging the resolution reduced images output from said plurality of prefilters into a full resolution frame;

encoding the full resolution frame into said encoded data stream; and transmitting said encoded data stream.

8. A receiver for receiving and decoding an encoded data stream into a plurality of image data channels, comprising:

a receiver for receiving said encoded data stream;

a decoder for decoding the encoded data stream and sequentially separating the decoded data stream into a plurality of resolution reduced images corresponding to said plurality of image data channels; and a plurality of postfilters for increasing the resolution of each of said plurality of resolution reduced images into fall resolution images and outputting the full resolution images as said plurality of image data channels.

9. The receiver according to claim 8, further comprising:

a plurality of digital output ports for outputting said plurality of image data channels in digital format;

a plurality of converters for converting said plurality of image data channels from digital format to analog format;

a plurality of analog output ports for outputting the plurality of image data channels image converted to analog format, thereby outputting said plurality of image data channels in both analog and digital format.

10. The receiver according to claim 8, wherein said plurality of postfilters increase the resolution of said plurality of resolution reduced images by interpolation.

11. The transmitter according to claim 8, wherein said receiver outputs four image data channels.

12. A method of receiving and decoding an encoded data stream into a plurality of image data channels, comprising the steps of:

receiving said encoded data stream;

decoding the encoded data stream and sequentially separating the decoded data stream into a plurality of resolution reduced images corresponding to said plurality of image data channels; and increasing the resolution of each of said plurality of resolution reduced images into fall resolution images and outputting the full resolution images as said plurality of image data channels using a plurality of postfilters.

13. A transmitter-receiver for transmitting and receiving a plurality of image data channels as an encoded data stream, comprising:

a transmitting section, comprising:

a plurality of prefilters corresponding to said plurality of image data channels for reducing the resolution of each image in said plurality of image data channels;

a frame memory for sequentially arranging the resolution reduced images output from said plurality of prefilters into a fall resolution frame;

an encoder for encoding the fall resolution frame into said encoded data stream; and a transmitter for transmitting said encoded data stream;

and a receiving section, comprising:

a receiver for receiving said encoded data stream;

a decoder for decoding the encoded data stream and sequentially separating the decoded data stream into a plurality of resolution reduced images corresponding to said plurality of image data channels; and a plurality of postfilters for increasing the resolution of each of said plurality of resolution reduced images into full resolution images and outputting the full resolution images as said plurality of image data channels.

14. A method of transmitting and receiving a plurality of image data channels as an encoded data stream, comprising the steps of:

reducing the resolution of each image in said plurality of image data channels using a plurality of prefilters corresponding to said plurality of image data channels;

sequentially arranging the resolution reduced images output from said plurality of prefilters into a full resolution frame using a frame memory;

encoding the full resolution frame into said encoded data stream using an encoder;

transmitting said encoded data stream;

receiving the transmitted encoded data stream;

decoding the encoded data stream and sequentially separating the decoded data stream into a plurality of resolution reduced images corresponding to said plurality of image data channels; and increasing the resolution of each of said plurality of resolution reduced images into full resolution images and outputting the full resolution images as said plurality of image data channels using a plurality of postfilters.

* * * * *